United States Patent [19]
Lukawski

[11] Patent Number: 5,042,196
[45] Date of Patent: Aug. 27, 1991

[54] APPARATUS FOR HYDROPONIC CULTIVATION

[75] Inventor: Walter J. Lukawski, Waterloo, Canada

[73] Assignee: Growth Response Optimization Inc., Rexdale, Canada

[21] Appl. No.: 371,733

[22] Filed: Jun. 27, 1989

[30] Foreign Application Priority Data

Jun. 29, 1988 [GB] United Kingdom ............... 8815482

[51] Int. Cl.$^5$ ............................................. A01G 31/02
[52] U.S. Cl. ............................................ 47/65; 47/62; 52/588
[58] Field of Search .................... 47/65, 63, 62, 17; 52/588

[56] References Cited

U.S. PATENT DOCUMENTS

| | | | |
|---|---|---|---|
| 1,983,806 | 12/1934 | Norman | 47/18 |
| 3,354,595 | 11/1967 | Abciuk | 52/588 |
| 3,425,158 | 2/1969 | Kyle | 47/65 |
| 3,595,726 | 6/1971 | Middleton | 52/588 |
| 4,028,847 | 6/1977 | Davis | 47/65 |
| 4,211,037 | 7/1980 | Green | 47/62 |
| 4,379,375 | 4/1983 | Eisenberg | 47/65 |

FOREIGN PATENT DOCUMENTS

| | | | |
|---|---|---|---|
| 2520190 | 7/1983 | France | 47/17 |
| 104530 | 5/1987 | Japan | 47/59 |
| 2127664 | 4/1984 | United Kingdom | 47/65 |
| 8103257 | 11/1981 | World Int. Prop. O. | 47/62 |

*Primary Examiner*—Henry E. Raduazo
*Attorney, Agent, or Firm*—Anthony Asquith & Co.

[57] ABSTRACT

The apparatus is concerned with an economical and efficient means for getting plants (e.g., lettuces, strawberries, etc.) into and out of the hydroponic growing troughs. The many troughs are stacked together in a rack. The troughs need not be moved for access purposes, relative to the rack, for insertion and removal of plants. Instead, the plants are placed on a flexible strip of fabric e.g. cheesecloth. The cheesecloth is drawn into the trough, and the plants are placed thereupon one by one as the strip moves progressively into the trough. This arrangement reduces the need for access room, and permits a maximum utilization of space in the growing room. The fact that the troughs never move also simplifies the lighting, ventilation, water supply and drainage structures.

9 Claims, 4 Drawing Sheets

APPARATUS FOR HYDROPONIC CULTIVATION

This invention relates to the hydroponic cultivation of food plants, such as lettuce.

BACKGROUND OF THE INVENTION

In the traditional methods of hydroponic cultivation, of such plants as lettuce, an enviromentally-controlled growth chamber is provided. In this chamber, the plants are grown under strictly controlled conditions of light, temperature, and humidity. The nutrient and water supply to the plants is also adjusted and controlled with strict accuracy, as is the oxygen supply to the roots. The carbon dioxide content of the air above and around the plants is also carefully monitored, and adjusted as required.

The main benefits of hydroponic cultivation lie in the excellent and consistent quality of the product, and in the fact that the product can be supplied fresh every day, all the year round. Thus, the supermarkets and the hydroponic cultivators may cooperate to supply fresh lettuces, etc, to the consumer with great administrative efficiency, and at a minimum cost.

The disadvantage of hydronic cultivation has been that the production costs are rather higher than for lettuces etc grown in fields. Although hydroponic lettuces require far less water than lettuce grown in fields (which can be the overriding factor in arid regions) hydroponic cultivation requires more capital equipment, and requires the input of energy, in the form of electricity for the lights, and for the temperature and humidity control equipment. The labour costs of planting out and harvesting, however, are generally less in hydroponic cultivation.

In the growth chamber, the plants are grown in trays or troughs, under water. Oxygen is supplied to the roots, which have been usually bedded in gravel. Bright fluorescent lights are positioned above the trays. In hydroponic cultivation, the lights can be arranged to operate with an optimised spectrum cycle at all times; whereas the spectrum of natural sunlight is optimum only for a few hours per day.

It is an aim of the invention to provide a means by which hydroponic cultivation of food plants such as lettuce may be carried out more economically and profitably than has been the case hitherto.

It is an aim of the invention to provide, in the hydroponic cultivation of food plants, a means whereby economic utilisation of space, of energy, water, and nutrients, and of labour, may be achieved.

GENERAL DESCRIPTION OF THE INVENTION

In the invention, in the growth chamber, the hydroponic trays are arranged in racks, in such a way that several trays are disposed one above another. In the invention, typically the trays are stacked eight high. The racks may be each about 2 ft high, in which case a stack of eight racks occupies a height of 16 feet. It is recognised, in the invention, that a height of 16 ft is optimum from the point of view of the economy of the building in which the growing room, or growth chamber, is located, because up to about 16 feet in height the building is basically a single storey building, whereas, above that height, the nature of construction of the building is changed, and the building becomes less economical.

In the invention, the racks comprise a fixed structural framework. The lighting tubes, and the various plumbing pipes, are all fixed to the racks, and the trays or troughs in which the plants are grown also remain fixed relative to the structural framework. Arranged thus, each rack may be seen to comprise a long tunnel, the floor of which comprises the tray or trough, and the roof of which comprises the lighting unit.

In the growing room, the racks are arranged side by side in a block of racks. The block may be, for example, 28 racks wide by 8 racks high. Apart from the 68 racks at the top, bottom, and sides of the block, the rest of the 224 racks in the block are accessible only from the axial ends of the racks, or tunnels.

The invention lies also in the manner in which the plants are placed into these long tunnels as seedlings, and in the manner in which the mature plants are harvested from the tunnels. In the invention, each trough is provided with a strip of flexible loose-mesh material, such as muslin or cheesecloth, which extends along the length of the tray.

To introduce the seedlings into the trough, the seedlings are placed, one by one, into the mesh of the material, and the material is drawn progressively along the length of the trough. For harvesting, the strip of material is drawn out of the trough, with the lettuce attached.

In the invention, there is no need to take the trough out of the rack in order to enter seedlings or to harvest the mature plants. In the invention, the only component that moves is the flexible strip. It may be noted that if the trough did have to be withdrawn from the rack, an access space equal in length to the length of the trough would have to be provided: such an access space is not required in the invention. Therefore, the growing room is used economically as regards space utilisation, since only a minimum of (wasted) access space need be provided.

When the trays are stacked—eight-high is preferred in the invention—of course there can be no access to the troughs from above. In the conventional hydroponic systems, the plants have been put into, and removed from, the troughs basically by a person standing over, and reaching down into, the trough. In the invention, such top-access is ruled out.

This apparent lack of access seems to be a disadvantage, but in fact is not so, in the invention, in that the invention makes use of the flexible strip, which allows the plants to be put into, and removed from, the troughs from the axial end of the "tunnel". Thus, there is no need ever to remove the troughs from the racks, nor to dismantle the rack framework in any way (except for structural repairs or alterations). The tunnel may remain intact at all times. The only access that is required is to the axial end of the tunnel.

The cheesecloth or other material remains under water in the trough. In the invention, no soil or gravel or similar substance need be provided in the trough since the roots are held securely enough by the material.

With the racks disposed as fixed tunnels, in the manner described, the important hydroponic parameters are concentrated into one place, and can be readily monitored and controlled. Thus, the oxygen content, and the carbon dioxide content, in the atmospheric air directly over the troughs can be closely manipulated, much more so than when the trays are disposed all on the same level, with a large open area above. Similarly, temperature and humidity can also be controlled more tightly.

It may be noted that although the racks may be regarded as "tunnels" these tunnels do not have sides. The environmental conditions—humidity, CO2 content, temperature, etc—are required to be most consistent throughout the growing room: if the tunnels had sides, a problem might arise regarding the constancy of these conditions.

Another saving is that, since the lights do not have to be moved in relation to the trays, the lights can be as long as the trays, and do not have to be in short, manageable lengths. If the trays are 12 ft long, for example, the light tubes also, preferably, are 12 feet long. The savings in electricity that arise from the use of one 12 ft tube, as compared with the use of two 6 ft tubes, is considerable.

Because the racks are stacked together, and the growing takes place in such a small, tight, concentrated area, one problem that can arise, in the stack of the invention, is that of preventing the temperature of the growing plants from rising unduly. It is preferred, in the invention, to use solid state ballasts for the lighting tubes: the reduced heat emission alleviates the possible overheating problem, and of course is more economical as regards electricity consumption.

As regards the physical labour required in planting out seedlings, and in harvesting the mature plants, the use of the flexible strip of material, and the arrangement of the end-access to the tunnels, mean a considerable simplification. Not only is the work less ardous than bending over a trough, but a better proportion of the worker's effort is useful.

One facet of the use of the flexible strip of loose-mesh material, in the invention, is that it would be rather difficult to separate the roots of the mature plant from the strip of material. Therefore, in the case of lettuce, the practice of leaving the roots attached to the plant, which has been quite common with traditional hydroponic cultivation, is not really practical with the invention. In the traditional hydroponic cultivation, however, the roots are bedded in gravel, or even soil, and it is easier to leave the roots on rather than to introduce the extra production operation of cutting them off.

In the invention, the roots have to be cut off the plants in order to separate the plants from each other and from the strip of material. Certainly, if the roots are left on, the plant can be expected to remain fresh for several days after harvesting, whereas a plant with its roots cut off should be offerred for sale only on the day it is harvested. However, this is not seen as a real disadvantage, in the invention, since one of the main points of hydroponic cultivation is that plants such as lettuce may be supplied to the supermarket fresh every day all the year round.

With plants such a strawberries, the plant itself remains behind on the strip of material after the food part of the plant is removed, and the strip, with the plant roots still attached, is put back in the trough to produce another crop. Again, as with lettuce, the operation of picking the strawberries is carried out by drawing the strip along the trough. Instead of cutting the plants from the strip, as with lettuce, the worker picks the strawberries from the plant. It may be noted, again, that in the invention the plants move to the picker, rather than the picker having to move along the row of plants, stooping over each one. It may be noted also that this arrangement makes it comparatively easy to automate the strawberry-picking function, if that should be desired.

Hitherto, the operation of producing lettuces, and the like, has involved the use of a large floor area. The idea of stacking the trays in racks has not been effectively explored, in that hitherto, it was considered that the work involved in lifting the trays onto the racks, and taking them down again, would more than use up any savings that might be made in floor space. In the invention, stacking the trays is of the essence, and one of the main factors which has permitted stacking to be achieved, without the expected problems thereof, has been the use of the strip of flexible material to permit the plants to be inserted into, and withdrawn from, the racks from the axial ends of the trays, without having to move either the racks or the trays.

DETAILED DESCRIPTION OF PREFERRED EMBODIMENT

By way of further explanation of the invention, an exemplary embodiment of the invention will now be described with reference to the accompanying drawings, in which.

Figure 1:
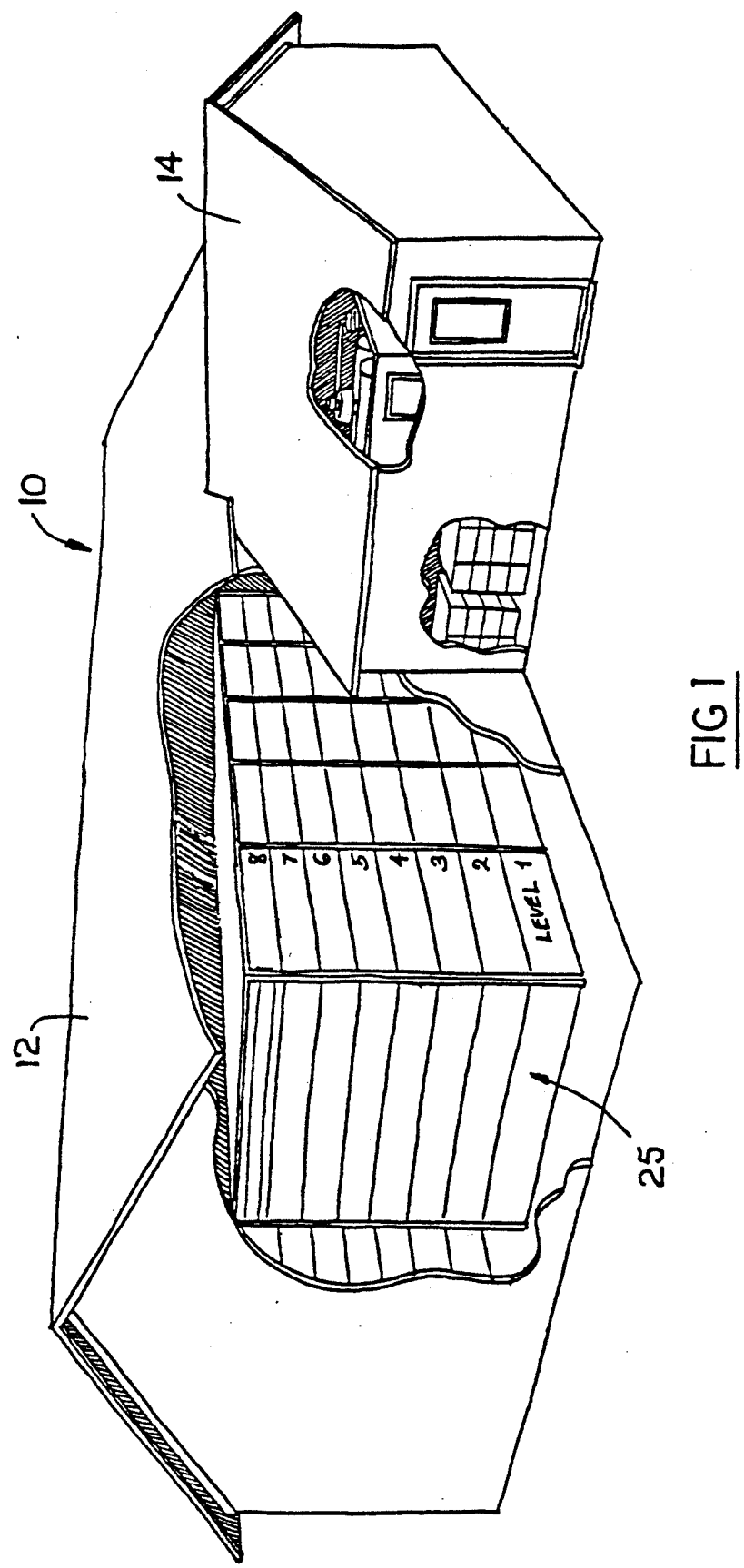
FIG. 1 shows a building, which is arranged according to the invention for the hydroponic cultivation of lettuce.
Figure 2:
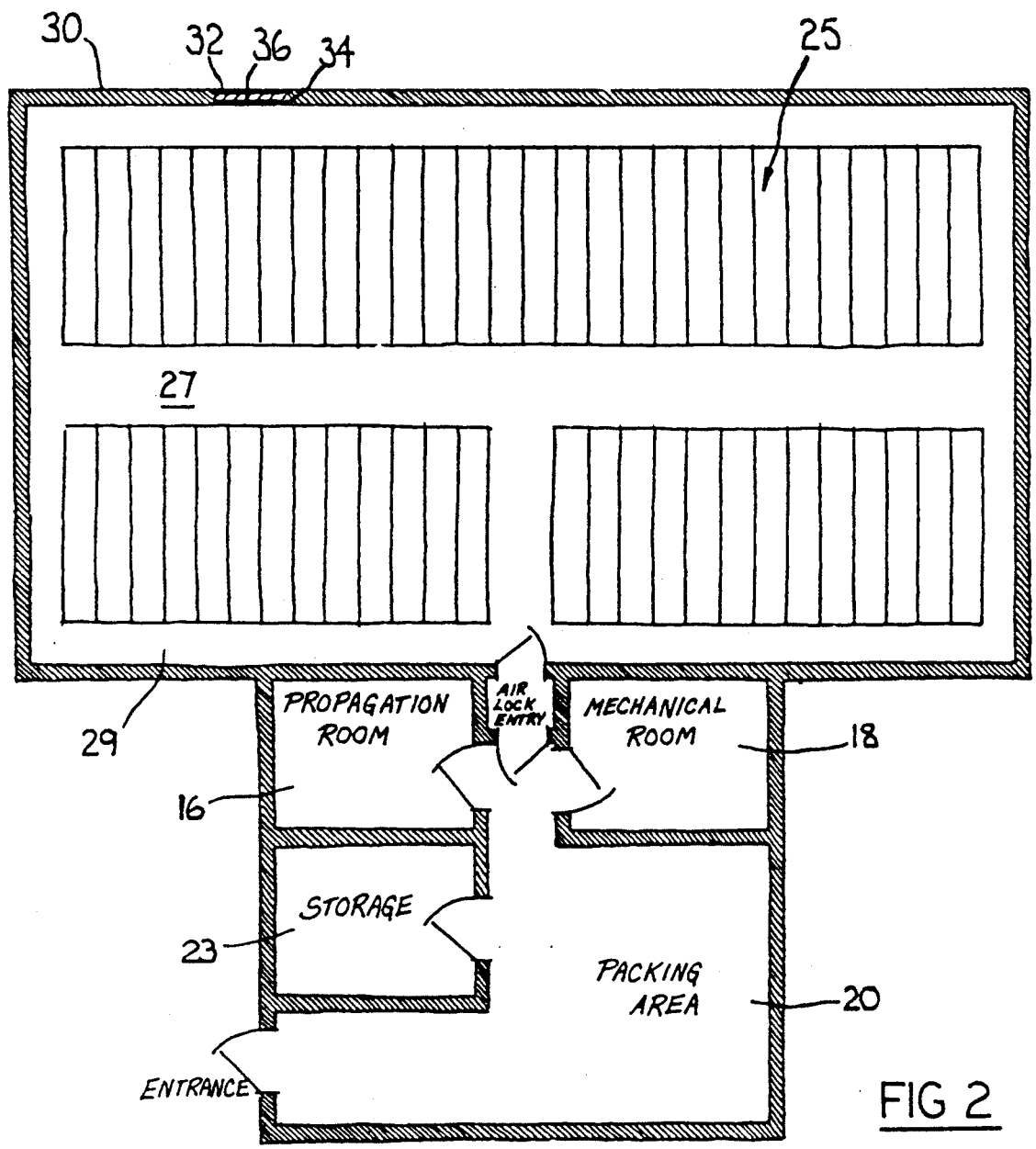
FIG. 2 shows the floor plan of the building of FIG. 1.

The hydroponic cultivation apparatus shown in the accompanying drawings and described below are examples of apparatus which embody the invention. It should be noted that the scope of the invention is defined by the accompanying claims, and not necessarily by features of specific embodiments.

The building 10 shown in the drawings comprises a growing room 12 and a preparation section 14. The preparation section 14 includes a propagation room 16, a mechanical room 18, a packing area 20, and a storage area 23. The growing room 12 is filled with racks 25. The growing room is provided with a central walkway 27, and with aisles 29.

The growing room 12 comprises the environmentally-controlled growth chamber which is essential to the invention.

The walls 30 of the growing room 12 are thermally insulated to a high degree. The actual method of construction of the walls depends on local circumstances, and building regulations. Typically, the outer skin 32 of the wall 30 may be of bricks, or of metal siding. The inner skin 34 may be of sheathing, which is made of wood, for example, or of Polywood (trademark), which is a polystyrene material resembling wood. Between the two skins 32,34 is a layer of insulating material 36, which may, typically, comprise rigid panels of polystyrene.

Whatever the method of construction, the walls 30 of the building 10 should preferably have an insulative rating of R-30. Similarly, the construction of the roof or ceiling of the building will depend on local circumstances; the ceiling preferably should have an insulative rating of R-40. The floor may be of epoxy concrete, and should also have good insulative properties. The walls should be sealed to the floor and sealing, in such a manner that the room is substantially completely airtight.

Alternatively, if required, the walls 30 may be of the kind that include a cavity or air-space. Alternatively again, in very cold climates, the walls 30 may be so constructed as to eliminate completely all metal links and connections between the outer and inner skins.

The components for the environmental control system are housed in the mechanical room 18. These components include equipment for heating and air-conditioning, ventilation, humidity control, etc (not shown in detail).

Access to the growing room 12 is via tandem doors 38, which are arranged in an airlock configuration.

Dimensionally, the growing room is 60 ft × 34 ft × 16 ft high.

The arrangement of the racks 25, which fill the growing room 12, may be described as follows. A framework 40 comprises vertical uprights 43, horizontal rails 45, and horizontal braces 47. The uprights, rails, and braces are made of steel bars welded together. The framwork 40 provides a means for supporting the growing trays 49.

Fluorescent lighting units 52 are attached to the underside of the rails and braces. The units 52 include tubes 54 and reflectors 56, which are arranged to shine down onto the trays 49.

The lighting tubes 54 are 12 ft long, the same length as the trays 49. The tubes are positioned some 16 to 20 inches above the tray 49. The overall height of each level of the rack is about 2 ft, so that eight of the racks can be accommodated in a 16 ft high building.

The tubes 54 are selected to provide a controlled, optimized spectrum of light for the trays. The ballast for the fluorescent tubes 54 is solid state electronic, as distinct from the conventional choke ballast, which not only provides a useful savings in electricity, but also makes it easier to prevent the temperature within the block of racks from rising too high.

Water is circulated through the troughs on a continuous basis. The water is prepared in a tank which is located in the mechanical room 18. Appropriate nutrients are added to the water, and the water is highly oxygenated. Oxygenation preferably is accomplished not by simply bubbling oxygen through the water, but by forcing the oxygen through a micropore membrane, of the kind used as an osmotic semi-permeable membrane. The dissolved oxygen content of the water is higher when oxygenation is done this way.

The nutrient- and oxygen-laden water is fed into one end of the troughs 50, through entry pipes 60. The troughs slope slightly (1 degree) and the water is collected as it exits from the other end of the trough. The water is circulated continuously, and is renewed on a by-pass make-up basis, approximately 1 percent of the water being renewed each passage through the troughs.

The nutrient content in the water being fed to the troughs may be varied between, for example, troughs having freshly planted seedlings, and troughs having almost mature lettuces. The water flowing out of the troughs may be all mixed together, or kept separated, as required.

The waste water effluent, which is replaced by the make-up water, is still quite rich in the (expensive) nutrients used in hydroponic cultivation. As such, the waste water represents a commercially useful by-product, in that the waste water may be sold as a fertilizer for house-plants and the like.

In use of the apparatus as described to grow lettuce, lettuce seeds are propagated in the propagation room 16. The seedlings are grown on cubes of phenolic foam, which is highly moisture-absorbent, or the like, the sides of the cubes being about 2 cm. The roots enter the spaces in the structure of the cube material. The cube gives physical support to the growing seedling. The cube may be inert, or the cube may be impregnated with suitable nutrient or anti-disease substances.

After about 8 days, the seedlings are transferred to the growing room 12. The transference is done as follows. First, one end of a strip 65 of muslin or cheesecloth, 12 ft long, is entered into an empty one of the troughs 50. The cubes supporting the lettuce seedlings 67 are placed on the mesh of the cheesecloth. The strip 65 is advanced a few inches into the trough 50. The next cube/seedling is then placed on the cheesecloth, and the next, until the whole 12 ft length of the strip 65 has been fitted with seedlings, spaced about 4.5 inches apart. The strip 65 of cheesecloth is now residing along the length of the trough 50. A cord may be attached to the strip, to simplify the operation of drawing the strip along the trough 50.

The strip 65 is dimensioned so as to lie on the bottom of the trough, where it will be immersed in the water circulating through the trough.

The growing lettuces remain under the lights 52. The temperature and humidity of the air in the building 10 is closely controlled. The roots of the growing lettuces are kept supplied with oxygen in the water, and the carbon dioxide required by the plants is periodicaly injected into the air above the plants. The CO2 is conveyed to the troughs 50 through pipes, and injected through suitable nozzles 69.

The strip 65 is left in the trough for about 21 days, at which time the mature lettuce may be harvested. For harvesting, the strip 65 of cheesecloth, with the mature lettuces attached, is drawn out of the trough 50. Preferably, the strip, with the lettuces still attached, is removed intact immediately from the growing room 12, and into the packing area 20, in order to preserve the very high degree of cleanliness required in the growing room 12.

During the growth period, the roots of the lettuce will have extended beyond the cube, and become entangled in the mesh. In the packing area 20, the lettuces are cut from the strip 65 at the roots, so that the roots and cubes remain behind, enmeshed in the cheesecloth. The strip of cheesecloth, with the roots and cubes still attached, may be thrown away.

As an alternative to a flat material, such as the cheesecloth described, the material used to support the roots of the lettuce plants may be any other material which is woven or knitted loosely enough to enable the roots to be inserted without damaging them. The material may be in the form of loosely woven rope, for example.

In the building of the dimensions described, with the racks arranged as shown, it is possible for around 53,000 lettuces to be growing at any one time. Based on a 21-day growth period, this means that some 2500 to 3000 lettuces mature per day. Two persons may be expected to handle the work of harvesting and packing that number of lettuces, and planting out the replacement seedlings, in a few hours per day. It is preferred to carry out that portion of the work that takes place inside the growing room 12 while the lights 52 are off, as the room 12 is so bright when the lights are on as to be uncomfortable to work in. The lights are switched off for a number of hours per day as part of the growing cycle.

If the supermarkets being supplied with lettuce close on Sundays, lettuces would not be harvested on Saturdays. If the number of lettuces sold per day varies in a predictable manner, as it usually does, the number harvested per day can be adjusted to suit.

It may be noted that the 12 feet length mentioned for the racks is about optimum. If the troughs were longer than that, the plants at the far end of the trough would be expected to receive a different nutrient and oxygen mix from the plants at the near end. That is for lettuce, in which the flow of water is quite slow: the optimum length of trough would be longer for plants which require a faster flow.

As mentioned, the "tunnels" formed by the racks of the invention have no sides, apart from the vertical uprights 43. This ensures a good circulation of air, so that the temperature, humidity, etc, remain even.

Figure 3:
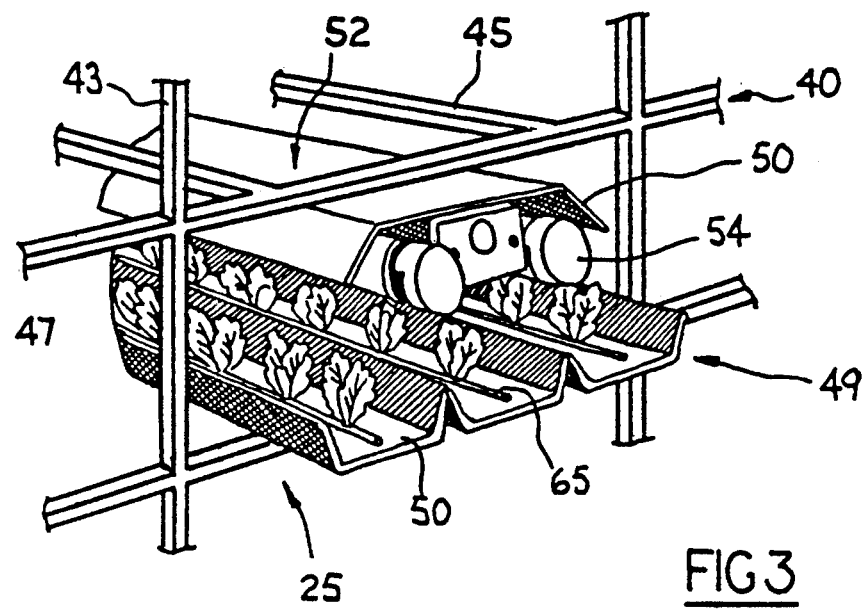
FIG. 3 is a close-up view of racks inside the building.
Figure 4:
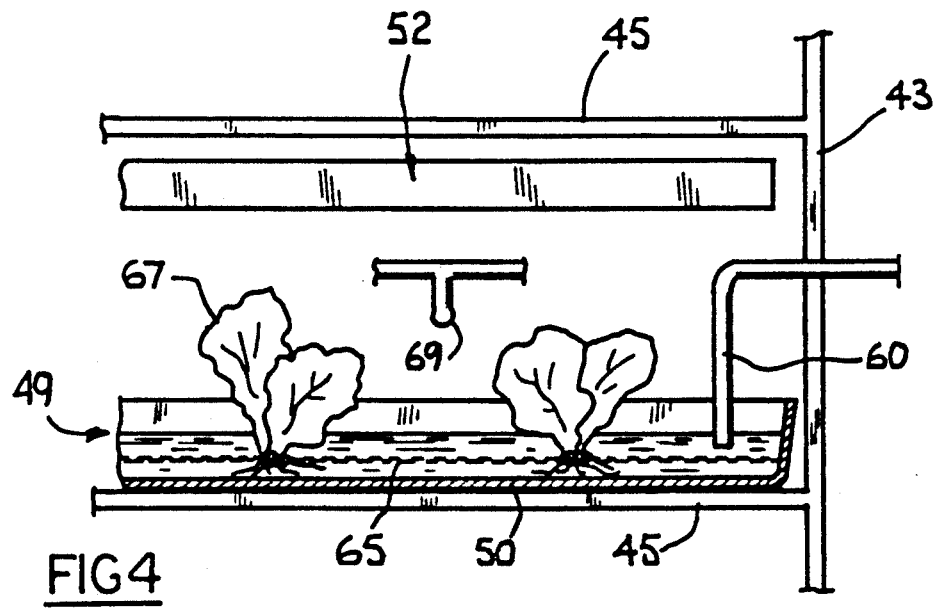
FIG. 4 is a side elevation of the racks of FIG. 3.

An important aspect of the invention lies in the manner of arranging the troughs. In FIG. 3, each growing tray 49 comprises three individual troughs 50, arranged side by side. The troughs are moulded, or extruded, from polywood.

Figure 5:
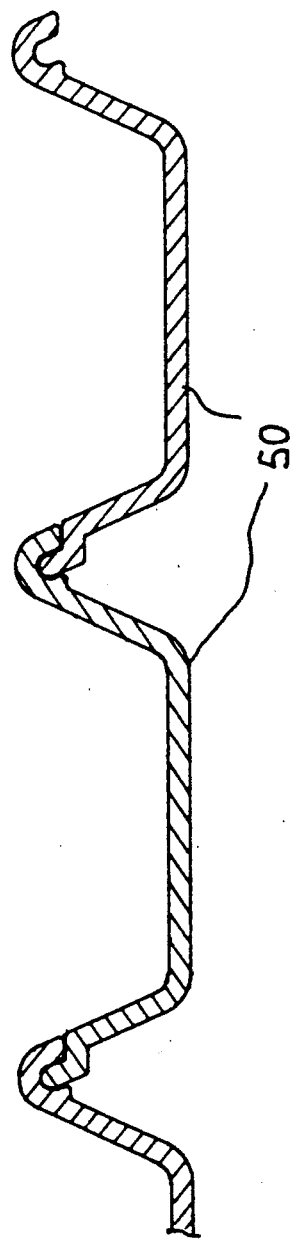
FIG. 5 is a cross-section of trays placed on the racks.

As shown in FIG. 5, the extruded cross-sectional shape of the troughs 50 includes special forms along the left and right side edges. The right edge form includes a female or socket portion 70, and the left edge form includes a complementary interlocking male portion 72. As will be appreciated, adjoining sections may be interlocked by assembling the sections together vertically. When the sections are interlocked, relative movement in the lateral sense is prevented.

It might be considered that plastic sheeting that has been extruded into a corrugated profile could be used to construct the troughs, in place of the separate interlocking sections. However, this would not be preferred in the invention. Each trough 50 has to span a length of some twelve feet and, although the trough is supported by cross-beams 47 at various points along the length of the trough, nevertheless the requirement is high for the material of the trough to be dimensionally stable, and for the trough to remain substantially undistorted. The trough must conduct the flow of water smoothly; if there were a tendency of the water to collect in pools at points along the length of the trough, due to distortion of the trough, that would cause quite a serious problem. Conventional extruded corrugated plastic sheeting tends to contain a good deal of locked-in stress, which causes the sheet inherently to twist and distort, generally to an extent that would be unacceptable for use in the invention.

The separate sections illustrated of course can never be entirely free from small distortions. But the left and right interlocking edge forms as shown in FIG. 5 prevent any cumulative build up of twisting and other distortions across the layer of troughs that might otherwise tend to occur, since each trough can settle to its own vertical level.

It is advisable that the material of the trough section be fairly thick, say 6 mm, to produce sufficient rigidity to counter a tendency of the trough to twist and distort.

Manufacturing the troughs in separate sections, which interlock together in the manner described, thus allows the troughs all to lie flat (each trough needs a slight slope to promote water flow), yet each section acts to control any tendency of neighbouring sections to twist or bend, but at the same time does not allow such twists or bends to build up across the layer.

When the trough sections 50 are interlocked, whether in groups of three as shown in FIG. 3, or in layers of troughs extending across much larger widths, a potential leak path 73 is defined between adjoining sections. If there is moisture or dirt present in the region of the upper surface 74 of the sections at the point 75 where the leak path 73 emerges, such moisture or dirt will enter the leak path. To keep the moisture and dirt out, the leak path is therefore so arranged as not to slope downwards from the point 75. Any moisture or dirt, if it were to find its way through, and to emerge into the area below the troughs, would fall onto the light units, whence the dirt or moisture would be very difficult to remove without a large scale disassembly of the apparatus.

One of the major expenses of hydroponic cultivation is in respect of the electricity consumed by the lamps. The shape of the interlocked edge forms, as illustrated, has the effect that the interlocked sections present a reflective surface to the lights, whereby light which strikes the edge area is reflected back, and is made available again for the plants. Especially in the case where the whole expanse of the layer of trough sections are interlocked together, the reflective surface is substantially unbroken, and very little of the light is wasted. This is especially so when the plastic material of the trough sections is shiny, and coloured white.

We claim:

1. Apparatus for hydroponic cultivation of growing plants, wherein:
   the apparatus includes a rack, and a stack of troughs positioned and supported in the rack;
   the trough stack comprises layers of troughs, which are arranged in a vertical stack, one above another, in the rack;
   each layer of troughs comprises a plurality of separate trough sections, each section being elongate in form, the sections being arranged side by side to form the layer;
   the apparatus includes a means for adding water and nutrients at a feed end of each trough and for conveying the water along the trough, and includes a means for draining the water from the other, or drain, end of the trough;
   the apparatus includes many plant supporters, one plant supporter to each trough and aligned with the length of the supporter along the length of the trough;
   each plant supporter includes a means for physically supporting several growing plants thereupon;
   each plant supporter is movable along the length of its respective trough in such a manner that the plants supported on the supporter may be brought to an end of the trough by the movement of the supporter;
   each plant supporter includes a means for retaining the plants thereupon against movement relative thereto during the said movement of the plant supporter, and during growing of the plant;
   the arrangement of the apparatus is such that the troughs remain stationary in, and relative to, the rack during the said movement of the plant supporter;
   the apparatus includes layers of lamps, the layers of lamps being intercalated between the layers of troughs, and being arranged to shine downwards into the troughs;
   the separate trough sections that comprise the layer of troughs are formed each with a male interlocking form along a left side edge thereof, and a complementary female interlocking form along the right side edge thereof;

the interlocking forms are so constructed and arranged that the male form of one of the sections may be inserted and interlocked into the female form of an adjacent one of the sections in consequence upon assembly movement taking place between these sections in a direction perpendicular to the plane of the layer; and the arrangement of the interlocking forms is such that, when interlocked, the sections are constrained against relative movement in the plane of the layer, and perpendicular to the lengths of the troughs.

2. Apparatus of claim 1, wherein the rack includes cross-beams and the interlocked sections simply rest upon the cross-beams, substantially without positive fastening thereto.

3. Apparatus of claim 1, wherein the upper surfaces of the sections, being the surfaces which face the lamps, are shiny.

4. Apparatus of claim 1, wherein the interlocking forms are so shaped that adjacent interlocked sections present to the lamps, at the said side edges, a smooth and substantially unbroken reflective surface.

5. Apparatus of claim 1, wherein the interlocking forms define a tortous potential leak path between the interlocked sections, and the line of the said path at the point at which the path emerges on the upper surface of the layer lies horizontally or slopes upwards from the upper surface, whereby moisture present on the upper surface tends not to enter the leak path.

6. Apparatus of claim 1, wherein the material of the sections is extruded plastic.

7. Apparatus of claim 6, wherein the sections are, in substance, rigid.

8. Apparatus of claim 7, wherein the plastic material is approximately 6 mm thick.

9. Apparatus of claim 2, wherein:

those upper surfaces of the sections which face the lamps are shiny;

the interlocking forms are so shaped that adjacent interlocked sections present to the lamps, at the said side edges, a smooth and substantially unbroken reflective surface;

the interlocking forms define a tortous potential leak path between the interlocked sections, and the line of the said path at the point at which the path emerges on the upper surface of the layer lies horizontally or slopes upwards from the upper surface, whereby moisture present on the upper surface tends not to enter the leak path;

and the material of the sections is extruded plastic, and the sections are, in substance, rigid.

* * * * *